United States Patent [19]

Karch

[11] Patent Number: 5,042,356

[45] Date of Patent: Aug. 27, 1991

[54] KIT FOR CONVERTING A CONVENTIONAL DRUM INTO AN ELECTRONICALLY TRIGGERED DRUM

[76] Inventor: Jeffrey M. Karch, 3610 Michigan Ave., Apt. #4, Cincinnati, Ohio 45208

[21] Appl. No.: 376,390

[22] Filed: Jul. 6, 1989

[51] Int. Cl.[5] .......................... G01D 13/02; G10K 11/24

[52] U.S. Cl. .......................................... 84/725; 84/743; 84/104; 84/411 R

[58] Field of Search .................................. 84/723–734, 84/743, 104, 411, DIG. 12, 24

[56] References Cited

U.S. PATENT DOCUMENTS

| | | | |
|---|---|---|---|
| 3,659,032 | 4/1972 | May | 84/600 |
| 3,956,959 | 5/1976 | Ebihara | 84/723 |
| 4,168,646 | 9/1979 | May | 84/723 |
| 4,226,156 | 10/1980 | Hyukutake | 84/730 |
| 4,227,049 | 10/1980 | Thomson et al. | 381/93 |
| 4,479,412 | 10/1984 | Klynas | 84/730 |
| 4,581,973 | 4/1986 | Hoshino | 84/723 |
| 4,648,302 | 3/1987 | Bozzio | 84/730 |
| 4,669,349 | 6/1987 | Hyakutake | 84/730 |
| 4,700,602 | 8/1987 | Bozzio | 84/DIG. 12 |
| 4,947,725 | 8/1980 | Nomura | 84/723 |

*Primary Examiner*—William M. Shoop, Jr.
*Assistant Examiner*—Brian Sircus
*Attorney, Agent, or Firm*—Wood, Herron & Evans

[57] ABSTRACT

A conversion kit enables a conventional drum to be transferred into an electronically triggered drum. The kit includes a circularly shaped foam pad, a circularly shaped plywood panel residing beneath the pad and brackets connectable to the peripheral sidewall of the conventional drum in order to support the panel and pad beneath the drumhead. A pair of transducers are mounted to a bottom surface of the panel, one located near the center of the drumhead, and the other located adjacent to the sidewall. Wire leads connect the transducers to jacks mounted in the sidewall of the drum, with one jack being longer than the other to distinguish between the transducer mounting locations. Preferably, the kit also includes a shock absorber mounted between the second transducer and the panel.

20 Claims, 1 Drawing Sheet

KIT FOR CONVERTING A CONVENTIONAL DRUM INTO AN ELECTRONICALLY TRIGGERED DRUM

This invention relates to a kit for converting a conventional drum into an electronically triggered drum.

BACKGROUND OF THE INVENTION

In order to supply sufficient sound to fill an arena or other type of musical performance venue, or to obtain differing sound effects, it has become quite common to electronically trigger the signal emanating from various types of musical instruments. A drum is one such instrument. By converting the mechanical movement of a drum head into electrical signals that are then fed into a computer and/or sound synthesizer, the sound signals can be reproduced at a much higher volume or can be mixed with other sound signals which are subsequently fed into a speaker.

One prior method of obtaining "electronically triggered" drum signals includes the use of a drum pad. The drum pad comprises a sheet of plastic mounted over a plywood board with one or more electronic pick up transducers attached directly to the underside of the board. Impact of drumsticks to the top of the drum pad produces mechanical vibrations which are detected by the transducers and converted to electrical signals. While a drum pad of this type produces electrical signals when the board is struck by a drumstick, the sounds eventually reproduced by transforming these signals back into mechanical vibrations often do not correspond to the sounds and effects produced by striking a conventional drum in the corresponding locations. In other words, it is difficult for the drummer to find that area of the pad which gives rise to the desired sound effects that would normally occur with a conventional drum. Even once these areas are located, the drummer must reorient himself each time he performs on one type of drum, and then switches to the other. From a practical standpoint, drum pads of this type have a different "feel" to the drummer using this pad from a conventional drum and also tend to wear out quickly and require frequent replacement.

In addition to use of the above described drum pad to produce an electronically triggered drum signal, commercially available add on parts enable an individual to modify a conventional drum into an electronically triggered drum. Such parts include a transducer which the musician attaches directly to the underside of a conventional drumhead in order to detect the mechanical movement of the drumhead and transform the movement into electrical signals. Unfortunately, drumhead attached transducers do not properly isolate the various mechanical vibrations of the drumhead. As a result, a multitude of strange signals and false triggers can be generated. Another disadvantage with this modified drum relates to the fact that the transducer must be constantly repositioned in order to obtain the various sound effects that are often desired. This represents a significant inconvenience to the drummer, or the sound technician. Although additional transducers could be mounted to the underside of the drumhead, each additional transducer weighs down the drumhead and affects mechanical vibrational capacity.

It is, therefore, an object of the invention to provide a simple, cost effective manner of electronically reproducing a drum signal which overcomes the prior disadvantages associated with drum pads and modified conventional drums.

SUMMARY OF THE INVENTION

The invention contemplates a conversion kit that enables a musician or technician to quickly and easily convert any conventional drum into an electronically triggered drum, the resulting electronically triggered drum having the look and feel of a conventional drum and the requisite versatility in producing a variety of desired sound effects.

To these ends, in accordance with a preferred embodiment of the invention, a conversion kit for converting a conventional drum into an electronically triggered drum includes a foam pad situated beneath the drumhead, a pick up board situated beneath the pad, brackets for attaching to the inner surfaces of the side wall of the conventional drum to hold the foam pad and board in place, a first transducer secured to the bottom of the pickup board in the center of the drum, a second transducer secured to the bottom of the pickup board near the periphery of the drum, with a shock absorber mounted therebetween, and wire leads that extend from the transducers to jacks mounted in the side wall. Preferably, one of the jacks is longer than the other to enable the musician to distinguish between the first and second transducers.

The conversion kit of this invention permits the simple and easy transformation of a conventional drum into an electronically triggered drum. The upper rim and drumhead of a conventional drum are removed. The brackets are secured to the inside surfaces of the sidewalls. Subsequently, the pickup board and the foam pad are placed on the brackets, the foam residing on top of the board. The first transducer is glued to the bottom surface of the pickup board in the center of the drum, and a shock absorber is secured to the bottom surface of the pickup board near the periphery, with the second transducer secured to the bottom of the shock absorber. If desired, securement of the transducers may occur prior to placement of the pickup board within the drum upon the brackets. A wire lead extends from each transducer to a jack mounted in a hole drilled in the sidewall of the drum. Preferably, one jack is slightly longer than the other, in order to distinguish between the locations of the transducers.

These and other features of the invention will be readily registered and followed in view of the following detailed description in the drawings in which:

DETAILED DESCRIPTION OF THE DRAWINGS

Figure 1:
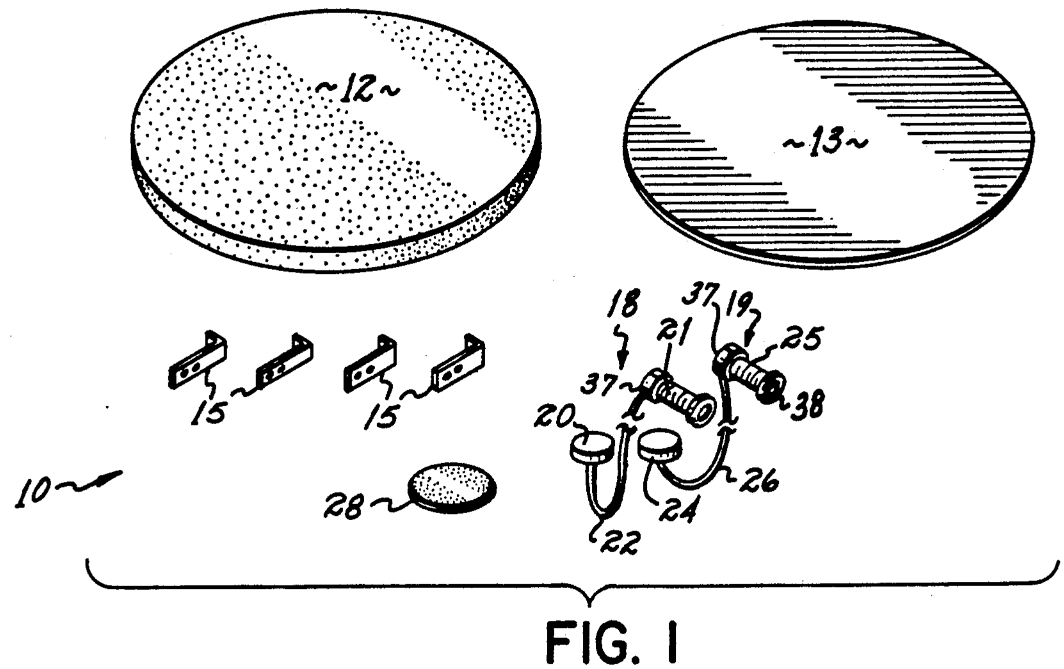
FIG. 1 shows the component parts of a conversion kit in accordance with a preferred embodiment of the invention.

FIG. 1 shows a conversion kit 10 for converting any conventional drum into an electronically triggered drum in accordance with the invention. The kit 10 includes a circular piece of resilient polyurethane foam 12 approximately 1" thick. The foam 12 serves as a vibration dampening pad beneath the drumhead of a conventional drum. A plywood disk 13, or pickup board, approximately ¼" thick, supports the foam pad 12. The pad 12 and the pickup board 13 have the same diameter, a diameter corresponding to the diameter of the conventional drum to be converted into an electronically triggered drum.

Four wooden mounting brackets 15 are adapted to be glued or otherwise fixed to the inside surface of the sidewall of the conventional drum in order to hold the pickup board 13 and pad 12 in place. A first electronic pickup assembly 18 and a second electronic pickup assembly 19 are adapted to be mounted to a bottom surface of the pickup board 13 in order to detect mechanical vibrations of the drumhead and transform the vibrations into electronic signals. Each electronic pickup assembly includes a transducer, a jack and a wire lead connected therebetween. The first assembly includes transducer 20, jack 21 and lead 22, and the second assembly 19 includes transducer 24, jack 25 and lead 26. Preferably, one of the jacks is longer than the other. The final component of the kit 10 is a shock absorber 28, preferably made of cork.

Figure 2:
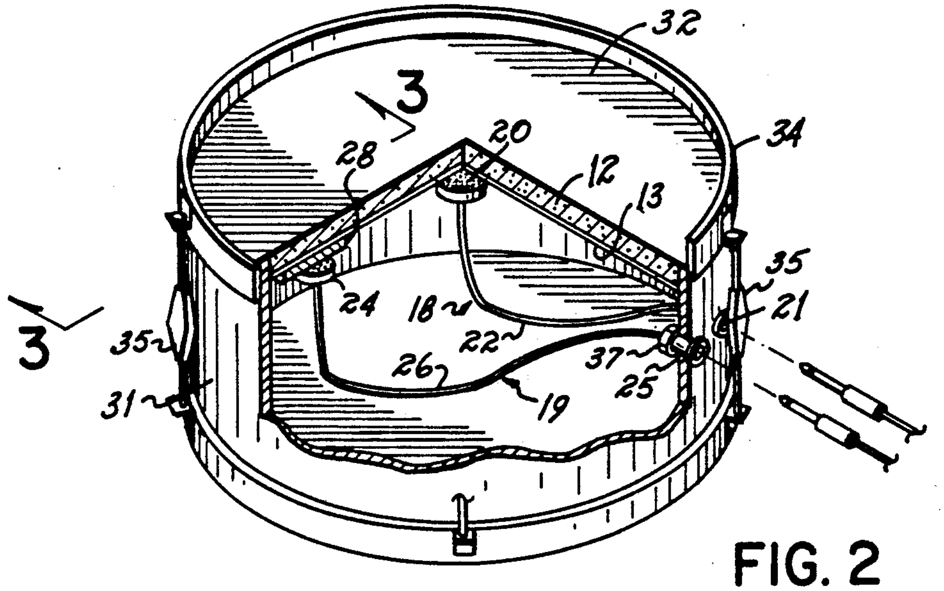
FIG. 2 shows an electronically triggered drum formed from a conventional drum with the conversion kit of this invention.
Figure 3:
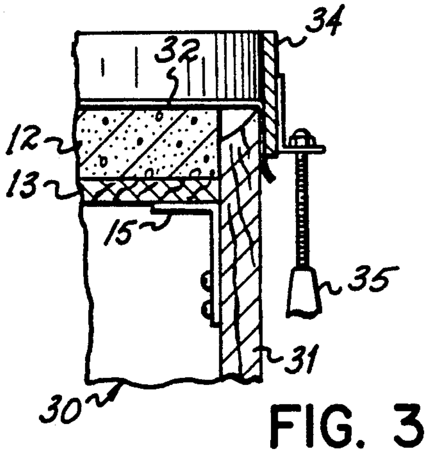
FIG. 3 is a cross sectional view taken along lines 3—3 of FIG. 2.

FIG. 2 shows the conversion kit 10 installed on a conventional drum 30. The drum 30 has a peripheral sidewall 31 that defines an open ended top, a drumhead 32 sized to cover the open end, an upper rim 34 and conventional fasteners 35 for tensioning the rim 34 downwardly upon the drumhead 32. The foam pad 12 is located beneath drumhead 32. The pickup board 13 is located beneath the foam pad 12, and is held in place by the sidewall mounted brackets 15, one of which is shown in FIG. 3. The pad 12 is supported by the pickup board 13, and the pad is in complete surface contact with the drumhead.

The first transducer 20 is mounted to the bottom of pickup board 13 near the center of the drumhead 32, preferably by gluing. The second transducer 24 is also secured to the bottom surface of the pickup board 13 near the periphery of the drumhead 32. First, the shock absorber 28 is mounted to the pickup board 13, and then the second transducer 24 is mounted to the shock absorber 28. Mounting may be achieved with any suitable adhesive. Wire leads 22 and 26 connect the mounted transducers 20 and 24 to the jacks 21 and 25, respectively.

FIG. 3 shows a cross-sectional view of a bracket 15 mounted to the sidewall 31 of the conventional drum 30. The bracket 15 is located a predetermined distance, preferably about 1¼", below a bottom surface of drumhead 32 so that the top of foam 12 is in contact therewith.

Figure 4:
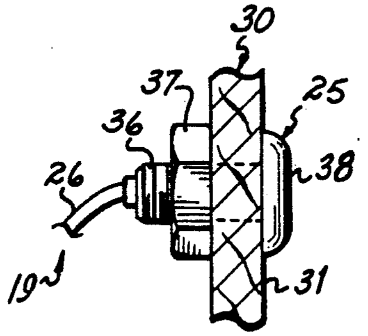
FIG. 4 is a cross sectional view, similar to FIG. 3, showing a jack mounted to the sidewall of the drum according to an alternative embodiment of the invention.

The jacks 21 and 25 are mounted within holes in the sidewall 31. While any one of a number of methods of mounting the jacks would be equally suitable, FIG. 4 shows a preferred embodiment wherein each jack includes an internally/externally threaded hub 36 onto which is threaded an internally threaded nut 37 on the inside of the sidewall 31. A stop head 38 located outside of sidewall 31 is threadably received within hub 36 through the mounting hole. As stated previously, one of the jacks is preferably longer than the other, or one of the jacks is mounted so as to protrude farther outwardly from the sidewall 31 so that a drummer or a sound technician may distinguish between the first 20 and second 24 transducers.

In only a few simple and easy steps, the kit 10 enables a conventional drum 30 to be transformed into an electronically triggered drum. When in place, the kit 10 does not affect the look and feel of the conventional drum 30, so that the musician does not have to reorient himself or herself to what would otherwise be a new instrument. The kit 10 is relatively inexpensive, and is also easy to install, remove and replace. Moreover, by mounting one transducer near the center of the drum, and the other transducer to a shock absorber near the periphery of the drum, the electronically triggered drum produced by this kit 10 provides the variation in electrical signals necessary for most desired drum sounds.

While a preferred embodiment of the invention has been described, applicant does not wish to be limited thereby, and it is to be understood that various modifications could be made without departing from the spirit of the invention. Accordingly, it is to be understood that changes may be made without departing from the scope of the invention as particularly set out and claimed.

I claim:

1. A kit for converting a conventional drum to an electronically triggered drum, the conventional drum having a peripheral sidewall and a drumhead, comprising:
   - a pad;
   - a pickup board;
   - means for removably mounting said pad and said pickup board in the conventional drum beneath said drumhead, the pad being in complete surface contact with said drumhead; and
   - a pair of electronic pickup assemblies, each assembly adapted to be secured to a bottom surface of the pickup board in order to detect mechanical vibration of said drumhead when impacted from above.

2. The conversion kit of claim 1 wherein said pad is about 1" thick and circular in shape.

3. The kit of claim 1 wherein aid pickup board is about ¼" thick and circular in shape.

4. A kit for converting a conventional drum to an electronically triggered drum, the conventional drum having a peripheral sidewall and a drumhead, comprising:
   - a pad;
   - a pickup board;
   - at least three brackets adapted to be secured to the sidewall of the conventional drum, the pickup board and the pad being supported by said brackets; and
   - a pair of electronic pickup assemblies, each assembly adapted to be secured to a bottom surface of the pickup board in order to detect mechanical vibration of said drumhead when impacted from above.

5. The kit of claim 1 wherein each electronic pickup assembly further comprises:
   - a transducer;
   - a jack;
   - a wire lead extending between said transducer and said jack.

6. The kit of claim 5 wherein one of said electronic pickup assemblies further comprises:
   - a shock absorber adapted to be mounted between said transducer and said pickup board.

7. The kit of claim 5 wherein one of said jacks is longer than the other.

8. A method of converting a conventional drum to an electronically triggered drum, the conventional drum having a peripheral side wall and a drumhead, comprising the steps of:

locating a pad beneath the drumhead;

locating a pickup board beneath the pad, the located pad being in complete surface contact with the drumhead; and securing at least one electronic pickup assembly to an underside of said pickup board, each at least one pickup assembly adapted to detect mechanical vibration of said drumhead and convert said vibration into an electronic signal when a top surface of said drumhead is impacted.

9. The method of claim 8 and further comprising the step of;

mounting brackets to the sidewall of the conventional drum to support said pad and pickup board beneath said drumhead.

10. The method of claim 9 wherein said brackets are located a predetermined distance from said drumhead so that a top surface of said supported pad is in contact with a bottom surface of said drumhead.

11. The method of claim 8 wherein each electronic pickup assembly includes a transducer, a jack, and a wire lead connected therebetween, and each said securing step further comprises the steps of:

securing the respective transducer to a bottom surface of the pickup board; and mounting the respective jack in a hole formed in the sidewall of the conventional drum.

12. The method of claim 11 further comprising the step of;

drilling holes in the sidewall of the conventional drum, said holes sized to hold said jacks in an interference fit.

13. The method of claim 8 wherein two said electronic pickup assemblies are mounted to an underside of said pickup board and further comprising the steps of:

mounting a first of said electronic pickup assemblies beneath a center portion of the drumhead; and mounting a second of the electronic pickup assemblies adjacent to the sidewall of the drumhead.

14. The method of claim 13 and further comprising the step of:

mounting a shock absorber between said second transducer and said pickup board.

15. An electronically triggered drum, the drum having a peripheral sidewall, a drumhead sized to cover a first open end of the peripheral sidewall, a rim for retaining the drumhead over the first open end, and means for tightening said rim downwardly upon said retained drumhead, and further comprising:

a pad located beneath said drumhead;

a pickup board located beneath said pad;

means for supporting said pad and said pickup board so that a top surface of said pad resides in complete surface contact with a bottom surface of said drumhead and contiguously with an uppermost portion of the peripheral sidewall, said supporting means being connectable to said sidewall;

a first electronic pickup assembly mounted to a bottom surface of said pickup board proximate to the center of said drumhead;

a second electronic pickup assembly mounted to a bottom surface of said pickup board adjacent to the sidewall of said drumhead; and a shock absorber mounted between said pickup board and second electronic pickup assembly.

16. A drum which has been converted by a conversion kit from a conventional drum to an electronic drum, the electronic drum having a peripheral sidewall and a drumhead, comprising:

a pad mounted on the underside of the drumhead in complete surface contact therewith;

a pickup board mounted on the underside of the pad, and a pair of electronic pickup assemblies, each assembly adapted to be secured to a bottom surface of the pickup board in order to detect mechanical vibration of said drumhead when impacted from above.

17. The drum of claim 16 wherein said pad is about 1" thick and circular in shape.

18. The drum of claim 16 wherein said pickup board is about $\frac{1}{4}$" thick and circular in shape.

19. The drum of claim 16 which further comprises bracket means for securing said pad and pickup board to said sidewall, said bracket means comprising;

at least three brackets adapted to be secured to the sidewall of the conventional drum, the pickup board and the pad being supported by said brackets.

20. The drum of claim 16 wherein one of said electronic pickup assemblies further comprises:

a shock absorber mounted between said transducer and said pickup board.

* * * * *